US00RE34666E

United States Patent [19]

Tacker

[11] E Patent Number: Re. 34,666

[45] Reissued Date of Patent: Jul. 19, 1994

[54] WALL PROXIMITY CHAIR

[75] Inventor: Bill D. Tacker, Okolona, Miss.

[73] Assignee: Super Sagless Corporation, Tupelo, Miss.

[21] Appl. No.: 915,892

[22] Filed: Jul. 15, 1992

Related U.S. Patent Documents

Reissue of:

[64] Patent No.: 4,805,960
Issued: Feb. 21, 1989
Appl. No.: 87,511
Filed: Aug. 20, 1987

[51] Int. Cl.[5] ..... A47C 1/02

[52] U.S. Cl. ..... 297/85

[58] Field of Search ..... 297/83-88, 297/68

[56] References Cited

U.S. PATENT DOCUMENTS

| | | | |
|---|---|---|---|
| 3,163,464 | 12/1964 | Martin et al. | 297/85 |
| 3,941,417 | 3/1976 | Re | 297/85 |
| 4,071,275 | 1/1978 | Rogers, Jr. | 297/85 |
| 4,108,491 | 8/1978 | Rogers, Jr. | 297/85 |
| 4,247,146 | 1/1981 | Cycowicz | 297/88 X |
| 4,291,913 | 9/1981 | Kowalski . | |
| 4,337,977 | 7/1982 | Rogers, Jr. et al. . | |
| 4,350,386 | 9/1982 | Rogers, Jr. . | |
| 4,367,895 | 1/1983 | Pacitti et al. . | |
| 4,515,407 | 5/1985 | Crum | 297/68 X |
| 4,531,778 | 7/1985 | Rogers, Jr. . | |
| 4,544,201 | 10/1985 | Rogers, Jr. | 297/84 X |
| 4,570,995 | 2/1986 | Rogers, Jr. | 297/85 X |
| 4,591,205 | 5/1986 | James | 297/85 |
| 4,740,031 | 4/1988 | Rogers . | |

*Primary Examiner*—Peter A. Aschenbrenner
*Attorney, Agent, or Firm*—Robert A. Elwell; Harold D. Jastram; Amy J. Hoffman

[57] ABSTRACT

A three-position incliner having a fixed back and side rail assembly with a seat and backrest mounted with a seat and backrest mounted for nonrestricted motion in the assembly. A linkage mechanism attached to each side rail supports the seat and backrest and the mechanism is handle actuated. The mechanism on each side includes a base plate attached to a side rail, a support link carried by front and rear pivot links in turn mounted on the base plate, a seat mounting link suspended from front and rear swing links in turn carried on the support link and a lazy tong linkage carrying a footrest and mounted on the seat mounting link.

15 Claims, 6 Drawing Sheets

WALL PROXIMITY CHAIR

Matter enclosed in heavy brackets [ ] appears in the original patent but forms no part of this reissue specification; matter printed in italics indicates the additions made by reissue.

INTRODUCTION

This invention relates to sofas and love seats having reclining backs and seats incorporated into them, and more particularly comprises a new and improved three-way incliner. In the reclining chair industry, sofas and love seats having a fixed outside back and side rails or arms are known as incliners.

At the present time, a number of three-position reclining chairs are on the market, which employ a variety of different kinds of mechanisms. These mechanisms have been incorporated into sectional furniture including sofas and love seats but have not been incorporated into incliners because they were believed not to provided enough forward motion of the seat and back as them move from upright to TV or fully reclined positions so as to avoid interference from the fixed back of the frame. Consequently, the reclining sofas and love seats heretofore available have been limited to two-position motions in which the seat and backrest are fixed with respect to one another, and the seat and backrest assembly is confined to movement between upright and TV positions. The three-position mechanisms have not proved entirely satisfactory even in the sectional furniture because it is difficult to keep the various furniture sections together when one section is subject to the opening and closing action of the movable seat and back.

In copending application Ser. No. 60,099 filed June 9, 1987 and assigned to the assignee of this application, one mechanism is disclosed which is suitable for use in an incliner-type seat. While that mechanism is most satisfactory, it is quite expensive, for it includes rollers, tracks and roller links to provide the motion required. The principal object of this invention is to provide a suitable three-way mechanism for incliners, which is substantially less expensive than the mechanism in that earlier filed application.

Another object of the present invention is to provide a seat construction wherein a stationary outside back and side frame is provided with an inside nonrestricted three-position seat and back with an appropriate, relatively inexpensive mechanism therefor. More specifically an object of the present invention is to provide an [inexpesive] *inexpensive* seat having a fixed outside frame, which includes side rails and a back, within which a seat and backrest may move between upright, TV and fully reclined position.

Another object of the present invention is to provide a relatively inexpensive mechanism suitable for use in a love seat or sofa, which will support a seat and backrest for movement within a fixed frame without interference with the back of the frame or a wall against which the frame may be placed.

Yet another object of the present invention is to provide an incliner with the same reclining action as a sectional piece without the incident disadvantages of such furniture.

In accordance with the present invention, the outside frame includes side rails and a back which are fixed with respect to one another and remain stationary when the seat and backrest are actuated. The back of the outside frame may be placed directly against a wall, and neither the wall nor the back of the outside frame interfere with the reclining motion of the seat and backrest. No clearance is required between any part of the seat and the wall.

The seat and backrest are carried by a linkage assembly that includes a mechanism on each side, and each mechanism has a base plate mounted on the stationary outside frame. The base plate carries a support link on front and rear pivot links, and the support link in turn carries a seat mounting link on a pair of swing links. A footrest is carried by a lazy tong linkage which is pivotally supported on the front of the seat mounting link, and a handle actuated drive mechanism is connected to the lazy tong mechanism for extending the footrest and initiating pivotal motion of the front and back pivot links so as to move the seat from the upright toward the TV position. The backrest is pivotally mounted with respect to the seat and is connected through a drive link to one of the swing links. When pressure is applied by the occupant of the seat to the backrest with the seat in the TV position, the seat mounting link is caused to swing upwardly and forwardly with respect to the fixed outside frame to provide room for the backrest to pivot rearwardly to the fully reclined position.

These and other objects and features of the present invention will be better understood and appreciated from the following detailed description of one embodiment thereof, selected for purposes of illustration and read in connection with the accompanying drawing.

BRIEF FIGURE DESCRIPTION

DETAILED DESCRIPTION

Figure 1:
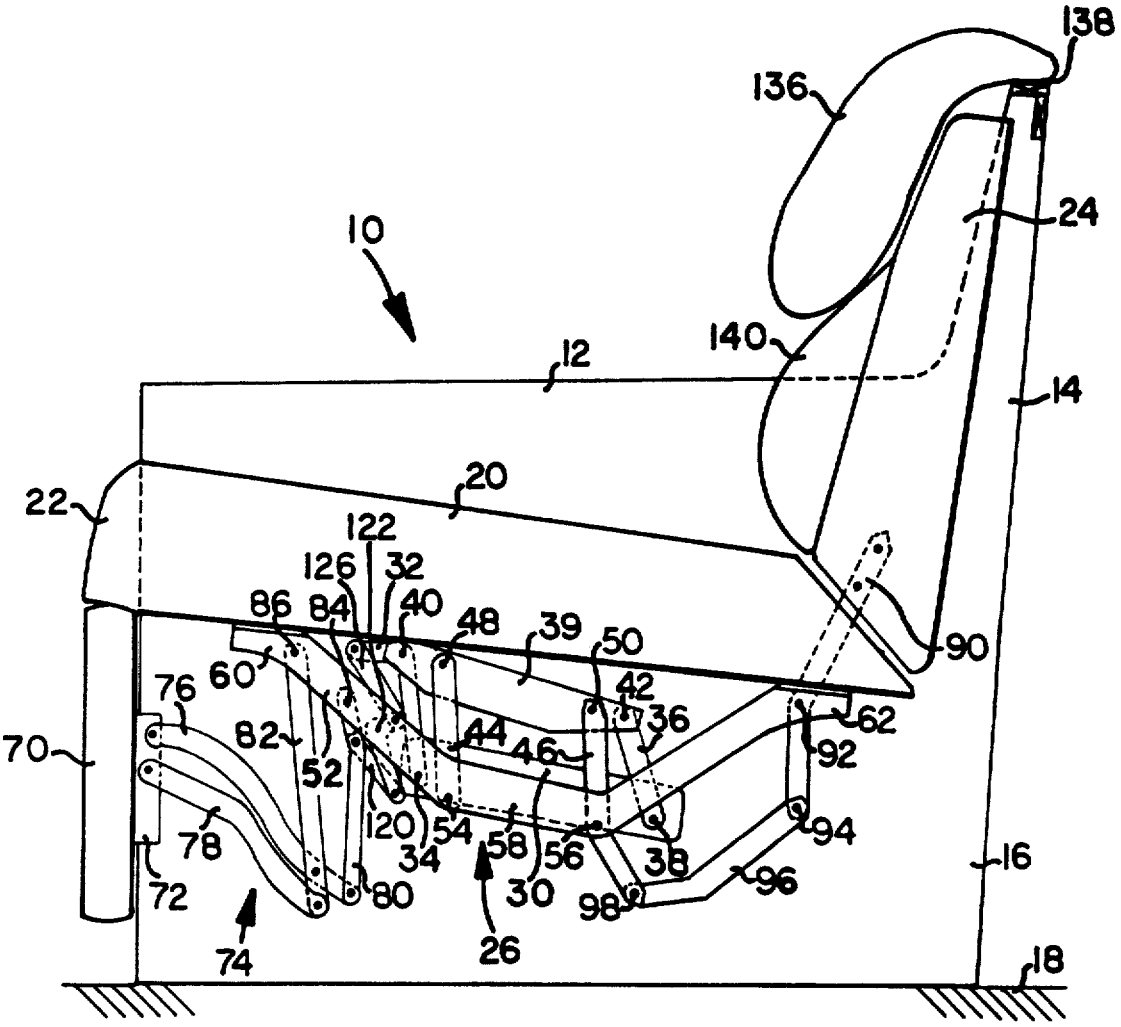
FIG. 1 is a [side elevation] *sectional* view of a three-position incliner showing the seat and backrest in the upright position.

When the word chair is used herein, it should be understood to include all types of upholstered furniture including sofas and loveseats for supporting an occupant in a sitting, partially reclined and fully reclined positions.

The frame within a frame incliner shown in the drawing includes an outer frame 10 having arms 12 and back 14 as an essentially unitary structure. The arms 12 form part of the side panels 16 (one side panel is shown) which rest on the floor 18. It is to be understood that the arms may be omitted and that the side panels 16 may terminate at their top below the plane of the upper surface 20 of seat 22.

Disposed within the outer frame 10 is the seat 22 and a backrest 24. The seat 22 and backrest 24 are supported within the frame 10 by the [linakge] *linkage* mechanism 26 described in detail below. It will be appreciated that the linkage mechanism described and shown is but one of two linkage mechanisms employed in the chair, one on each side of the incliner. As one is the mirror image of the other, only one need be described.

Each mechanism 26 includes a support plate 30 which is bolted or otherwise secured to the inner surface of a side panel 16 beneath the seat 22. The support plate 30 at its front end carries a front pivot link 32 connected to it by rivet 34. At its rear end support plate 30 carries a rear pivot link 36 pivotally connected to it by rivet 38. The front and rear pivot links 32 and 35 carry a support link 39 connected to their upper ends by rivets 40 and 42. The support link 39 is capable of moving between the first position shown in FIG. 1 and a second position shown in FIGS. 2 and 3.

Support link 39 carries front and rear swing links 44 and 16 connected to the support link by rivets 48 and 50. The swing links 44 and 46 in turn carry the seat mounting link 52. The lower ends of the swing links, by means of the rivet pivots 54 and 56, are connected to the midsection 58 of the seat mounting link. The front and rear ends 60 and 62 of the seat mounting link are connected to the frame (not shown) of the seat 22 so that the seat 22 moves with the seat mounting link.

Disposed beneath the front of the seat 22 when the chair is in the upright position is a leg rest 70 [carries] *carried* by a bracket 72 mounted on a lazy tong linkage 74. The lazy tong linkage includes links 76 and 78 connected at one end to the bracket 72 and at the other end to the second pair of links 80 and 82, respectively, that in turn are pivotally connected by rivets 84 and 86 to the seat mounting link 52.

The backrest 24 is carried by backrest bracket 90 pivotally connected by rivet 92 to the rear portion 62 of the seat mounting link 52. The lower end of the backrest bracket 90 is connected by means of rivet 94 to a seat drive link 96, which in turn is attached at its other end by rivet 98 to the lower end of rear swing link 46.

Figure 3:
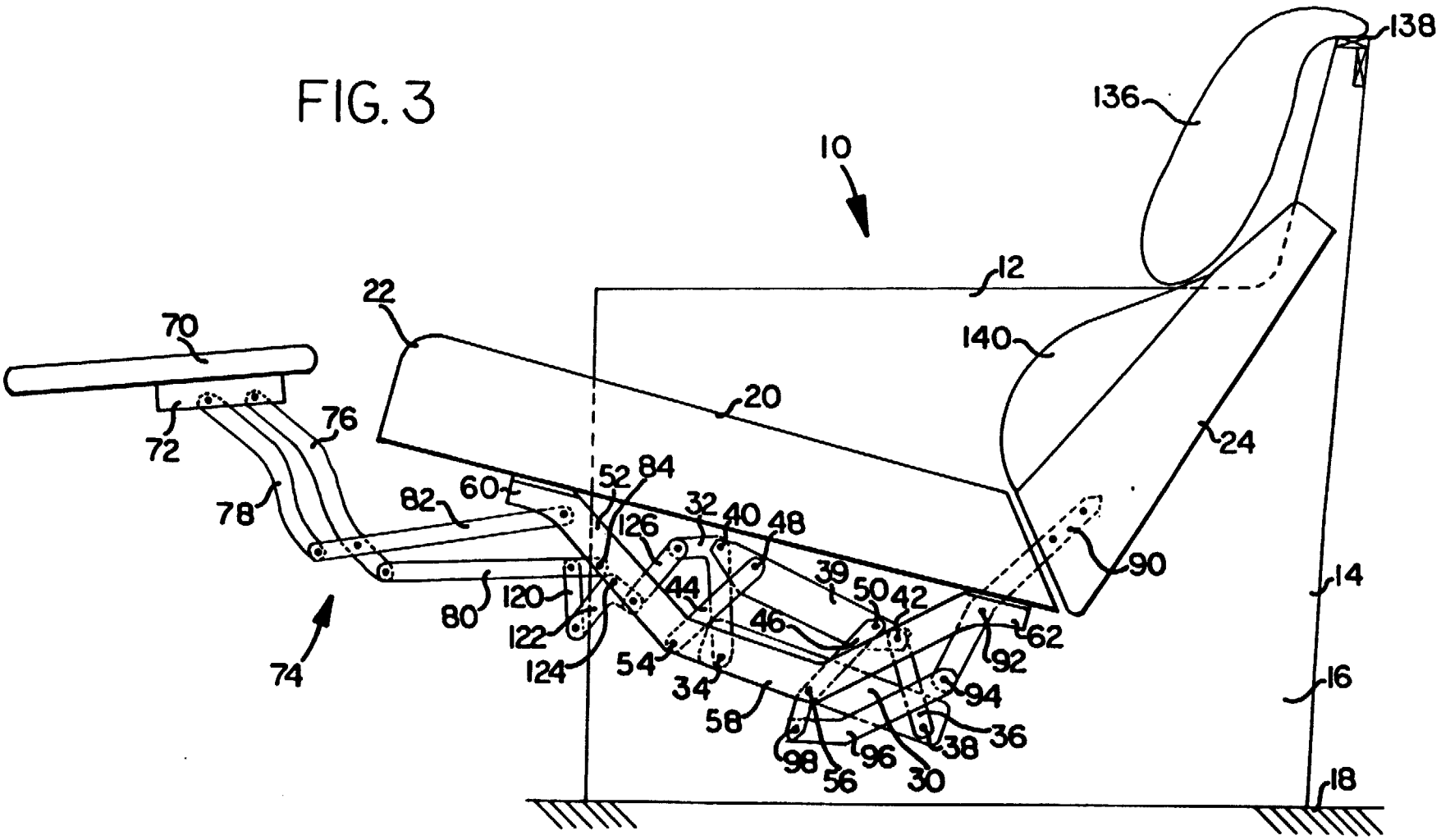
FIG. 3 is a [side elevation] *sectional* view similar to FIGS. 1 and 2 but showing the seat and backrest in the fully reclined position.
Figure 4:
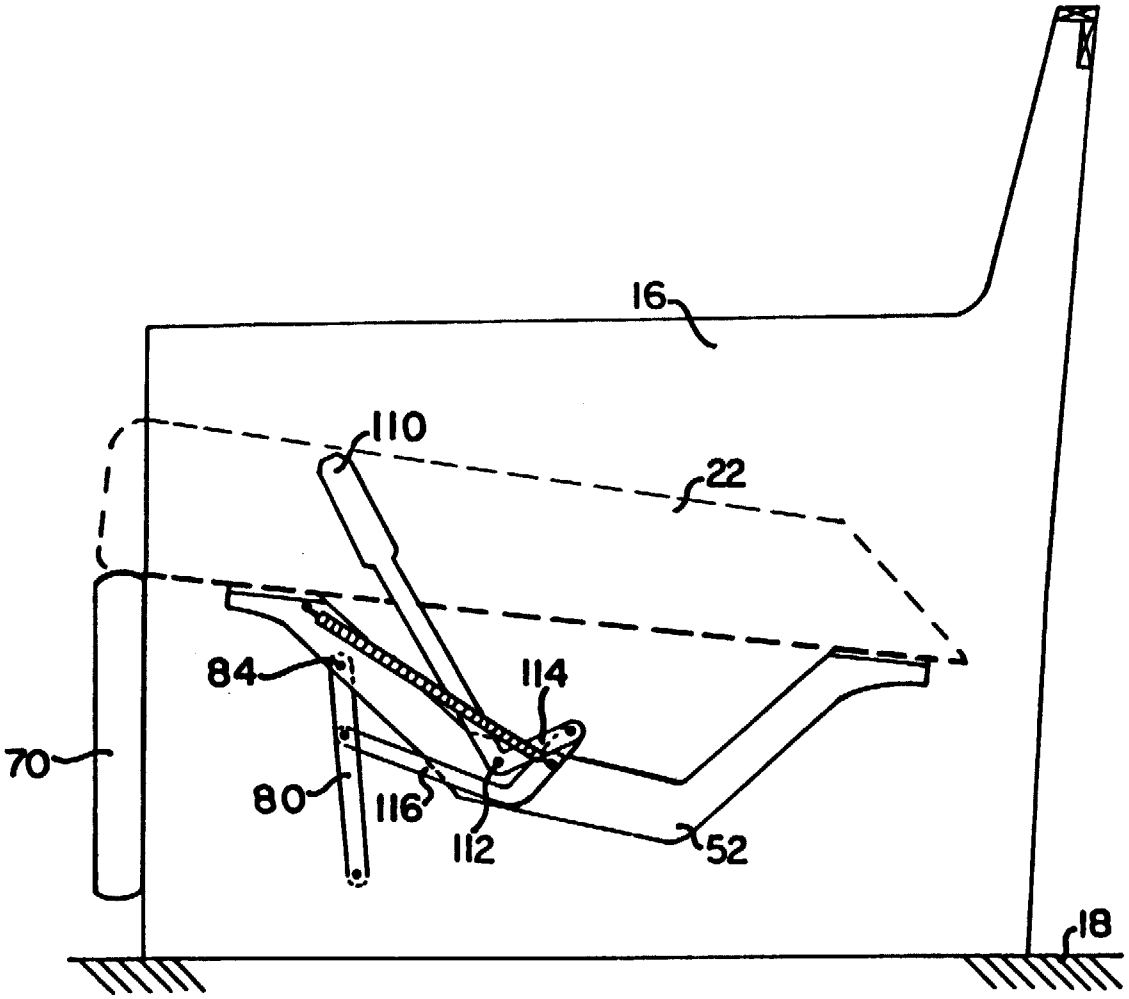
FIG. 4 is a fragmentary detailed view of the mechanism in the upright position and showing the handle assembly for actuating the mechanism to the intermediate reclining position.
Figure 5:
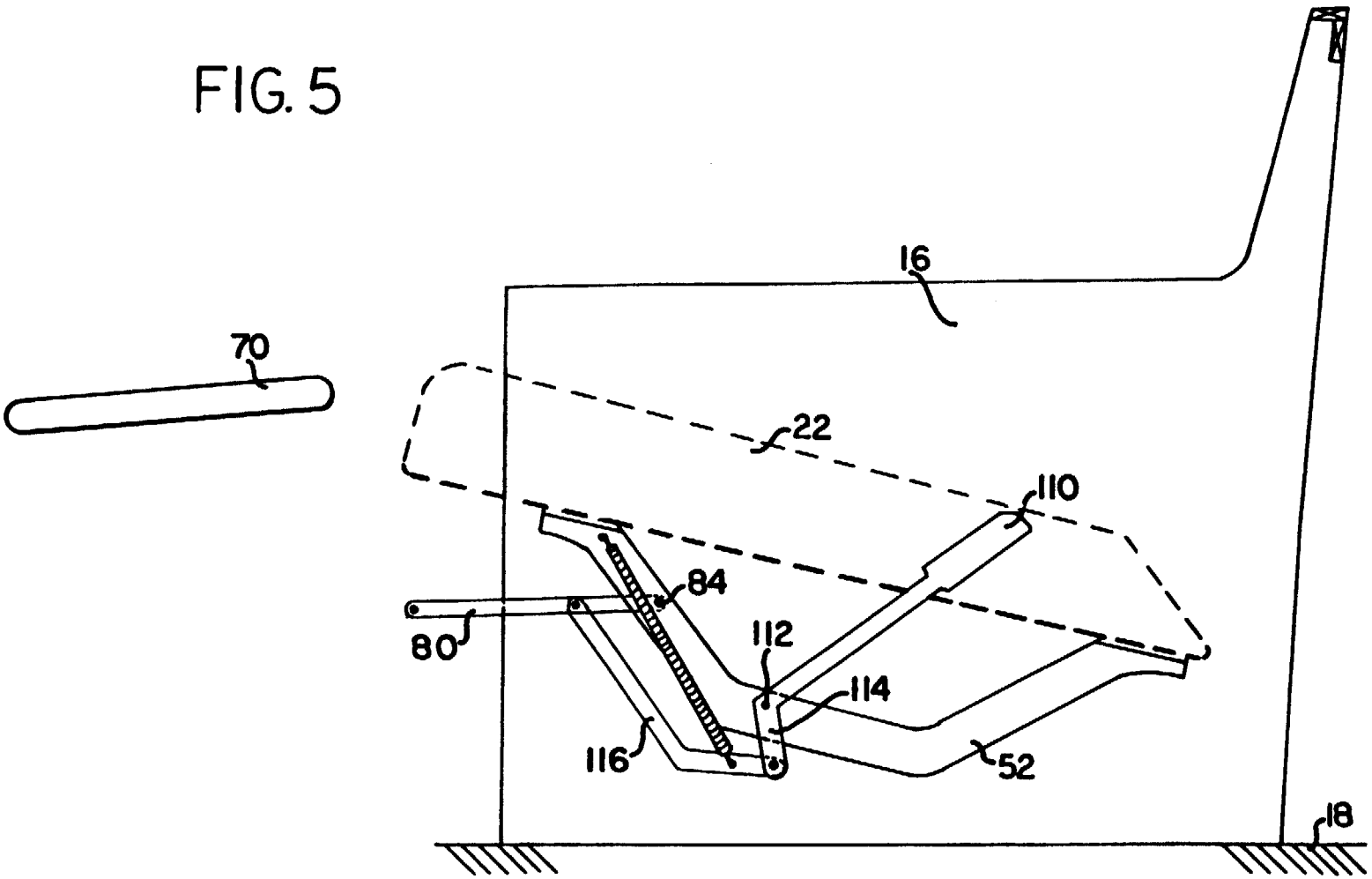
FIG. 5 is a fragmentary view similar to FIG. 4 and showing the mechanism in the intermediate reclining position.
Figure 6:
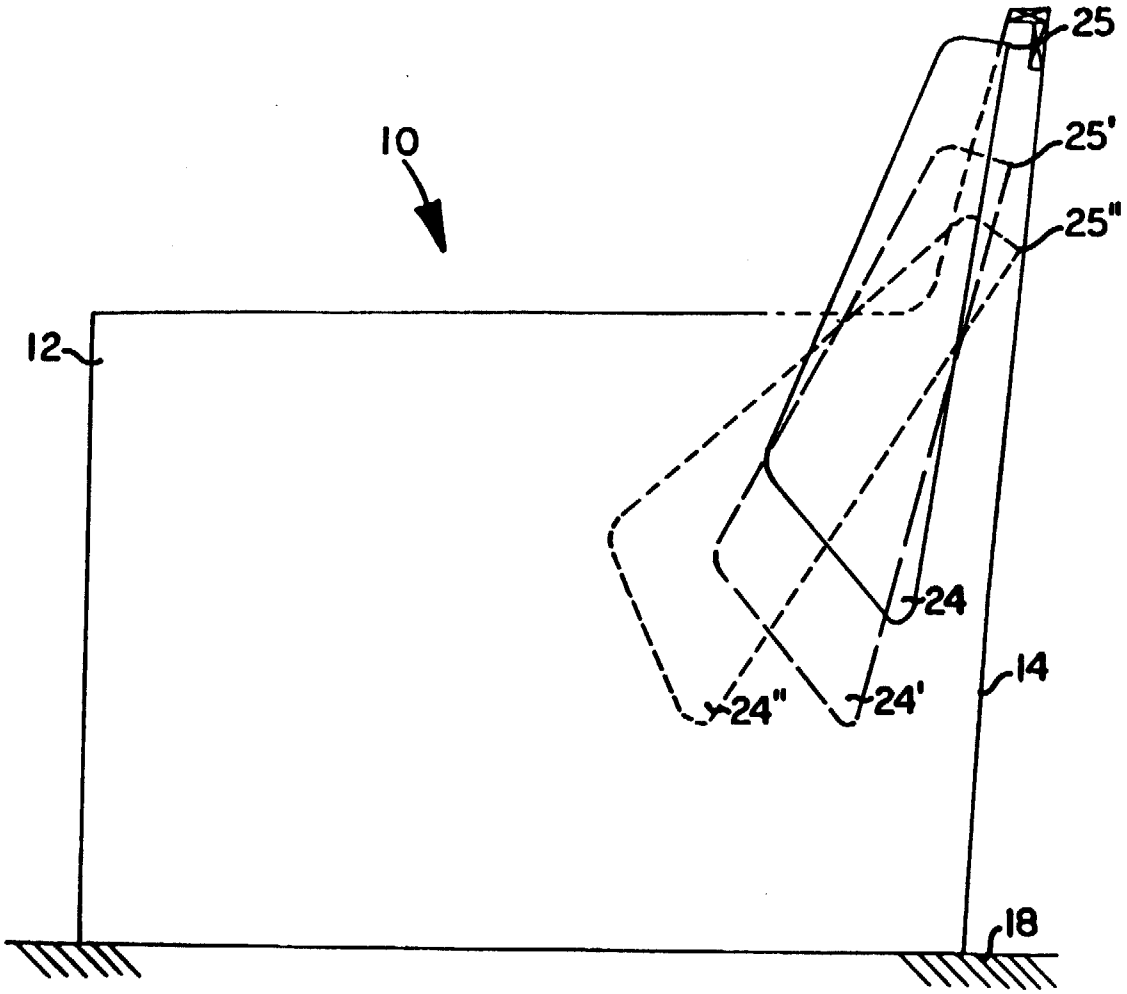
FIG. 6 is a side view of the chair showing the relation of the fixed and movable backs in the upright position in full lines and their relationship in the TV and fully reclining positions in broken lines.

A handle actuating mechanism may be mounted [on] *adjacent* the inside of the side panel 16 and is pivotally fixed to the seat mounting link 52. The handle mechanism is shown in FIGS. 4 and 5, and includes a handle 110 mounted on a shaft 112 which in turn carries a connecting link 114. The connecting link 114 is shown integral with the handle 110 but may be made as a separate piece and fixed to it. The link 114 is connected to a trigger link 116 in turn secured to the link 80 of the lazy tong linkage 74. When the handle is drawn rearwardly by the occupant of the chair, the link 80 of the lazy tong linkage is pivoted forwardly about its pivot rivet 84 on the seat mounting link (compare FIGS. 4 and 5) so as to initiate movement of the footrest 70 from the upright position to FIG. 1 to the intermediate reclining position of FIG. 2. As the link 80 pivots clockwise from the position of FIG. 1, the link 120 moves to the left with it, and causes the bell crank 122 to pivot clockwise on its pivotal support rivet 124 on seat mounting link 52 (see FIGS. 2 and 3). The rotational motion of bell crank 122 in turn causes connecting link 126 to swing the front pivot link 32 forwardly on the support plate 30 and carry the support link 39 forwardly with it. The same action also, of course, pivots the rear pivot link 36 forwardly. When the front and rear pivot links 32 and 36 pass over center, that is, move from the slightly rearwardly inclined position to a position wherein the pivots 40 and 42 are forward of the bottom pivots 34 and 38, the occupant's weight will cause the front and rear pivot links 32 and 36 to swing further forward and assume the position shown in FIG. 2. In this position, the seat is in the so-called intermediate reclining or TV position with the seat forward of and below the upright position (compare the position of the seat 22 in FIGS. 1 and 2), and the footrest is fully elevated. Thus, the support link 39 moves forwardly with respect to the fixed support plate 30 while very little or no relative motion occurs between the support link 39 and the seat mounting link 52. During this action, the relative positions of the seat 22 and backrest 24 remain fixed, that is, the seat and backrest move together. It will be noted in FIG. 6 that the backrest moves forward and downwardly to the position shown in broken lines at 24'. To move the chair to the fully reclined position, the chair occupant pushes against the backrest 24, which causes the backrest bracket 90 to pivot clockwise, as viewed in the drawings, about pivot rivet 92. As the bracket pivots clockwise about rivet 92, the drive link 96 is pushed in a forward direction, which causes the rear swing link 46 to pivot clockwise about its pivot rivet 50 on the support link and move the seat mounting link 52 further forward within the fixed outer frame. This action is evident by a comparison of FIGS. 2 and 3. The position of the backrest 24 in the fully reclined position is shown at 24" in FIG. 6. It will also be noted in FIG. 6 that the back 14 of the chair does not engage or otherwise interfere with the motion of the backrest 24. No contact is made with the corner 25 of the backrest.

The incliner illustrated has a backrest height of approximately 36 inches as measured from the floor. When the incliner is in the upright position, a head pillow 136 (see FIG. 1) attached by stitching or otherwise along its top edge 138 to the top of the fixed back 14 blends into and overlaps the cushion 140 of backrest 24 to form a comfortable support for the occupant's head. When the incliner moves to the TV position of FIG. 2, the backrest 24 slides downwardly with respect to the back 14 (see also FIG. 6) and the headrest cushion 136 lies just above the cushion 140, and the arrangement continues to provide a comfortable head support for the occupant. In the fully reclined position of FIG. 3, pillow 136 remains a continuation of the backrest 24, and, therefore, is in a comfortable position for the user. When the incliner returns to the upright position, the configuration of the top of the backrest 24 causes it to slide under the pillow 136 and resume the full line position of FIG. 6.

Figure 2:
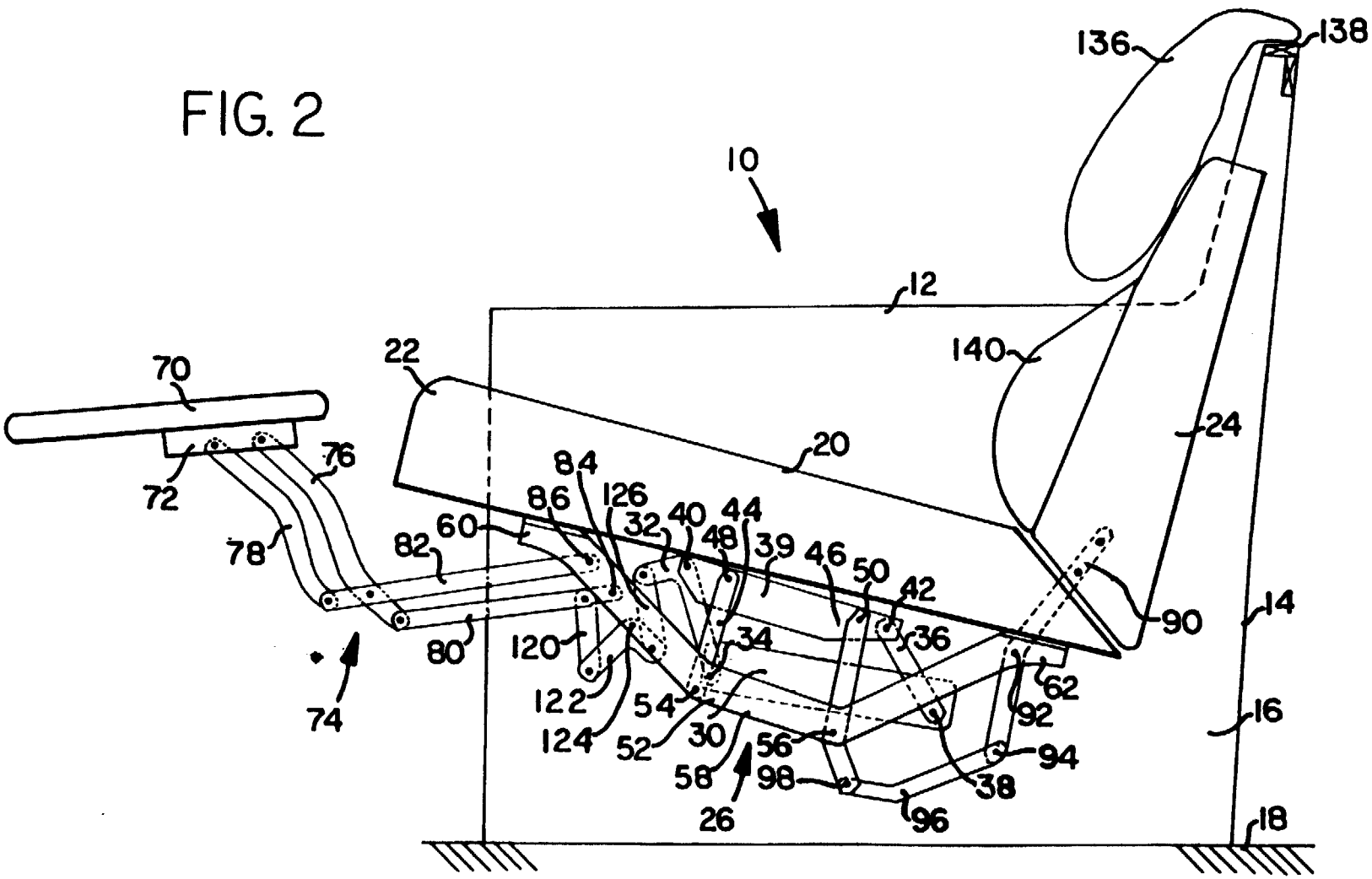
FIG. 2 is a view similar to FIG. 1, but showing the seat and backrest in the intermediate reclining or TV position.

To return the incliner to the intermediate reclining position from the fully reclined position, the occupant need only relieve the pressure against the backrest 24 which will enable the backrest to return to the position of FIG. 2 and the seat mounting link 52 to swing rearwardly on swing links 44 and 46 to the position shown in that figure. To return to the upright position the occupant presses downwardly with his or her legs on the footrest 70, which causes the footrest and lazy tong linkage 74 to return to the position beneath the seat 20. Simultaneously, the front and back pivot links swing clockwise so as to return the seat to the upright position.

It will be appreciated that the foregoing arrangement provides a three-way incliner that may be positioned against a wall. This three-way incliner has many obvious advantages over the two position incliners heretofor available over the two position incliners heretofor available. In the prior art devices, no relative movement is provided between the backrest and the seat, and the backrest merely tips rearwardly as the seat moves from the upright to the reclined position. The incliner of the present invention has all the comforts of the three-way recliners now on the market as the mechanism may be conveniently incorporated into a one piece sofa or love seat. The arrangement of the present invention may be incorporated either into an end seat, or the center seat of a sofa because one or neither of the side panels of the fixed outside frame may be high so as to form arms for the furniture.

Having described this invention in detail, those skilled in the art will appreciate that numerous modifications may be made thereof without departing from the spirit of this invention. Therefore, we do not intend to limit the scope of this invention to the specific embodiment illustrated and described. Rather, its scope is to be determined by the appended claims and their equivalents.

I claim:

1. A frame within a frame incliner chair comprising a fixed [outer] *outside* chair frame having a stationary back and side panels, a seat and backrest disposed within the [outer] *outside chair* frame and a footrest operatively connected to the seat, said seat, backrest and footrest being movable between upright, TV and reclining positions, and linkage mechanisms on each side of the chair carrying the seat and backrest, each of said mechanisms including:

a support plate secured to [the inside] *an inner surface* of the side panel, a support link carried on front and rear pivot links which are pivotally connected to the support plate, front and rear swing links pivotally connected to the support link and in turn pivotally connected to a seat mounting link, said seat mounting link carrying the seat, a lazy tong linkage, carrying the footrest and mounted on the seat mounting link for movement between retracted and extended positions, a backrest bracket pivoted on the seat mounting link and connected to the rear swing link by a backrest support link, and a handle actuated mechanism interconnected to the lazy tong linkage and to the support link for extending the leg rest and for swinging the support link forwardly on the pivot links to move the seat and back rest forwardly and downwardly within the fixed outside [frame] *chair* from an upright to a TV position, said backrest support link swinging the seat link forwardly with respect to the support link and [outside] *fixed outside chair* frame when pressure is exerted against the backrest to recline the backrest as the seat moves forward within the [outside] *fixed outside chair* frame.

2. A frame within a frame incliner chair comprising an [outer] *outside* chair frame having a fixed back and side panels, a seat disposed with the [outer] *outside chair* frame and supported by a linkage mechanism on each side for movement from an upright to a TV to a fully reclined position in sequence, each of said mechanisms including a base plate rigidly connected to and fixed with respect to the side panels, a support link mounted above the base plate and carried by front and rear pivot links on the base plate for fore and aft movement within the [stationary] *outside chair* frame, a seat mounting link carrying the seat and disposed below the support link and carried by front and rear swing links connected to the support *link* for fore and aft movement with respect to the support link, and actuating means interconnected to the support and seat mounting links first causing the support link to move forwardly with respect to the outside *chair* causing the seat mounting link to move forwardly with respect to the support link and move the seat to the fully reclined position.

3. A chair as defined in claim 2 wherein the mechanisms include a backrest bracket pivotally secured to the seat mounting link and a backrest support link is connected to the bracket and a swing link, said backrest support link forming part of the actuating means for moving the seat mounting link forward with respect to the support link.

4. A chair as defined in claim 2 wherein the incliner chair includes a footrest and *one of* the mechanisms includes a lazy tong carried by the seat mounting link and in turn carrying the footrest and movably between extended and retracted positions, said lazy tong being connected to the actuating means and being extended when the support link moves forwardly with respect to the outside *chair* frame.

5. A chair is defined in claim 3 wherein the incliner chair includes a footrest and the mechanisms include a lazy tong carried by the seat mounting link and in turn carrying the footrest and movable between extended and retracted positions, said lazy tong being connected to the actuating means and being extended when the support link moves forwardly with respect to the outside *chair* frame.

6. A chair as defined in claim 4 wherein said actuating means includes a handle, a pivotal support for the handle mounted on the seat mounting *link* plate, linkage means connecting the handle to the lazy tong [linkage] for extending the footrest when the handle is actuated, and means interconnecting the lazy tong [linkage] to one of the pivot links for initiating forward motion of the support link when the leg rest is extended.

7. A chair as defined in claim 5 wherein said actuating means includes a handle, a pivotal support for the handle mounted on the seat mounting [plate] *link*,

[linkage] means connecting the handle to the lazy tong [linkage] for extending the footrest when the handle is actuated, and means interconnecting the lazy tong linkage to one of the pivot links for initiating forward motion of the support link when the leg rest is extended.

8. A frame within a frame three-way incliner chair comprising an [outer] *outside* chair frame having a fixed back and side panels, a seat and backrest disposed within the [outer] *outside chair* frame and supported by linkage mechanisms for movement from an upright to a TV to a fully reclined position in sequence, said mechanisms including a base plate rigidly connected to and fixed with respect to the side panels, a support link mounted above the base plate and carried by front and rear pivot links on the base plate for fore and aft movement within the [stationary] *outside clair* frame, a seat mounting link carrying the seat and disposed below the support link and carried by front and rear swing links connected to the support link for fore and aft movement with respect to the support link, actuating means interconnected to the support link and seat mounting link causing the support link to move forwardly with respect to the outside *chair* frame to move the seat from the upright position to the TV position, a backrest bracket pivotally secured to the seat mounting link and carrying the backrest, and a drive means connected to the bracket and to the swing link causing the seat mounting link to move forward with respect to the support link and move the seat from the TV position to the fully reclined position when the backrest is pivoted back on the bracket with respect to the seat.

9. A three-way incliner chair comprising an outer chair frame having a fixed back and side panels, a seat and backrest disposed within the outer frame, said backrest being substantially the same height as the fixed back and disposed in front of it when the chair is in an upright position, a mechanism adjacent each side of the seat for supporting the seat and backrest within the frame for movement from an upright to a TV and fully reclined positions, each of said mechanisms having a seat mounting link connected to and carrying the seat, first and second means supporting the seat mounting link and interconnected to the frame, said first means enabling the seat to move forwardly within the frame from a first position to a second position and said second means enabling the seat to move further forwardly in the frame from the second to a third position, a backrest bracket interconnecting the seat and backrest enabling the backrest to pivot rearwardly with respect to the seat, actuating means connected to the mechanisms and mounted on the seat mounting link for initiating motion of the first means to move the seat from the first to the second position, and drive means interconnecting the backrest bracket and the second means for causing the seat to move from the second to the third position when the backrest is pivoted rearwardly with respect to the seat.

10. A three-way incliner chair as defined in claim 9 wherein the first means includes a pair of pivot links fixed at their lower ends with respect to the frame when the seat moves from the first to the second position [,].

11. A three-way incliner chair as defined in claim 9 wherein the second means includes a pair of swing links.

12. A three-way incliner chair as defined in claim 10 wherein the second means includes a pair of swing links connected to the seat mounting link, and the first and second means include a support link which is mounted on the pivot links and to which in turn the swing links are connected.

13. A three-way incliner chair as defined in claim 9 further comprising a footrest, a lazy tong linkage forming part of each mechanism and supporting the footrest with respect to the seat and enabling the footrest to be moved between retracted and extended positions, said actuating means being connected to the lazy tong linkage to extend the footrest when initiating motion of first means to move the seat from the first to the second position.

14. A three-way incliner chair as defined in claim 10 further comprising a footrest, a lazy tong linkage forming part of each mechanism and supporting the footrest with respect to the seat and enabling the footrest to be moved between retracted and extended positions, said actuating means being connected to the lazy tong linkage to extend the footrest when initiating motion of first means to move the seat from the first to the second position.

15. A three-way incliner chair as defined in claim 12 further comprising a footrest, a lazy tong linkage forming part of each mechanism and supporting the footrest with respect to the seat and enabling the footrest to be moved between retracted and extended positions, said actuating means being connected to the lazy tong linkage to extend the footrest when initiating motion of first means to move the seat from the first to the second position.

* * * * *